(12) United States Patent
Xue et al.

(10) Patent No.: US 11,977,865 B2
(45) Date of Patent: May 7, 2024

(54) SOFTWARE AND HARDWARE COLLABORATIVE COMPILATION PROCESSING SYSTEM AND METHOD

(71) Applicant: ZHEJIANG LAB, Zhejiang (CN)

(72) Inventors: Lei Xue, Hangzhou (CN); Tao Zou, Hangzhou (CN); Ruyun Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 16 days.

(21) Appl. No.: 17/979,752

(22) Filed: Nov. 2, 2022

(65) Prior Publication Data
US 2023/0236807 A1 Jul. 27, 2023

(30) Foreign Application Priority Data
Jan. 25, 2022 (CN) .......................... 202210085178.5

(51) Int. Cl.
*G06F 8/30* (2018.01)
*G06F 8/41* (2018.01)
*G06F 9/48* (2006.01)

(52) U.S. Cl.
CPC ................ *G06F 8/37* (2013.01); *G06F 8/447* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 10,127,022 | B2 * | 11/2018 | Sharma | ...................... G06F 9/48 |
| 10,447,806 | B1 * | 10/2019 | Sahay | ...................... H04L 41/12 |
| 2004/0039848 | A1 * | 2/2004 | Estrada | ...................... G06F 8/71 |
| | | | | 719/315 |

(Continued)

FOREIGN PATENT DOCUMENTS

| | | |
|---|---|---|
| CN | 104662513 A | 5/2015 |
| CN | 107210931 A | 9/2017 |
| CN | 112579063 A | 3/2021 |

OTHER PUBLICATIONS

Cardoso et al., "LARA: An Aspect-Oriented Programming Language for Embedded Systems," ACM, 2012. (Year: 2012).*

(Continued)

*Primary Examiner* — Ryan D. Coyer
(74) *Attorney, Agent, or Firm* — W&G Law Group

(57) ABSTRACT

A software and hardware collaborative compilation processing method and system. The system comprises an environment configurator, a command parser, a code filler, a scheduler and a heterogeneous target system, wherein the code filler is configured for obtaining the source program path of a user, reading source codes and identifying the heterogeneous target system according to a macro definition, complementing the codes related to the heterogeneous target system, carrying out primary filling and secondary filling on the source codes; the scheduler is configured for realizing compilation scheduling and execution scheduling functions respectively; the heterogeneous target system is configured for compiling and processing user modal data, and comprises at least two heterogeneous target subsystems; each target subsystem comprises a target-related middle-end compiler, a back-end compiler and a target-related running environment.

8 Claims, 5 Drawing Sheets

(56) References Cited

U.S. PATENT DOCUMENTS

| | | | | |
|---|---|---|---|---|
| 2015/0106790 A1* | 4/2015 | Bigwood | ............ | G06F 11/3624 |
| | | | | 717/127 |
| 2015/0199185 A1* | 7/2015 | Saff | ........................... | G06F 8/30 |
| | | | | 709/225 |
| 2019/0349261 A1* | 11/2019 | Smith | ................. | H04L 61/5069 |
| 2021/0365253 A1 | 11/2021 | Zhai et al. | | |

OTHER PUBLICATIONS

Soni et al., "Composing Dataplane Programs with µP4," ACM, 2020. (Year: 2020).*
Vass et al., "Compiling Packet Programs to Reconfigurable Switches: Theory and Algorithms," ACM, 2020. (Year: 2020).*
Yu et al., "A Survey on the Edge Computing for the Internet of Things," IEEE, 2017. (Year: 2017).*
CN Notice Of Allowance(202210085178.5), dated Mar. 17, 2022.
Specification-Language-for-Packet-Parsers-and-Its-Compiler-Architecture.
Survey-on-the-Languages-in-the-Northbound-Interface-of-Software-Defined-Networking.
Emerging-High-Performance-Computin-Systems-and-Technology.
Load-Balancing-Schedule-Technology-of-Operating-System-Software-Package-Building-System.

* cited by examiner

SOFTWARE AND HARDWARE COLLABORATIVE COMPILATION PROCESSING SYSTEM AND METHOD

CROSS-REFERENCE TO RELATED APPLICATIONS

The present application claims priority to Chinese Patent Application No. 202210085178.5, filed on Jan. 25, 2022, the content of which is incorporated herein by reference in its entirety.

TECHNICAL FIELD

The present disclosure relates to the field of computer networks and in particular to software and hardware collaborative compilation processing method and system.

BACKGROUND

In recent years, the deep integration and development of information network and various fields of economy and society has brought various professional and personalized service carrying demands. At present, it has become the consensus of academia and manufacturers to quickly and efficiently deploy custom network modes on a unified network infrastructure through a SDN (Software Defined Network).

With respect to the demand of custom network mode, the SDN network cannot meet all kinds of functions including calculation, storage, forwarding and security through flexible programming in technology, nor can it meet the requirement of high-speed processing of complex network modes in performance. Therefore, in the SDN network, developing a set of software and hardware collaborative compilation processing system can fully release the maximum potential of compiling modal data of various heterogeneous target systems, and then meet the differentiated business capability requirements in different application scenarios.

From the perspective of technology implementation, there are currently two types of compilation mechanisms: software compilation and hardware compilation. The software compilation processing mechanism supports flexibility and programmability, with low investment, but low data processing performance; the hardware compilation processing mechanism has high data processing performance, but the programmability to realize the processing mode is poor, which cannot meet the custom requirements.

SUMMARY

In view of the shortcomings of the prior art, the present disclosure provides a software and hardware collaborative compilation processing method and a system therefor, which are used to solve the needs of custom network modes in the existing SDN network. The SDN network cannot implement various functions including calculation, storage, forwarding and security through flexible programming in technology, and cannot meet the problems of high-speed processing of complex network modes in performance. By combining the advantages of software and hardware collaborative compilation processing, flexible programming and efficient processing of custom network modes can be realized.

The present disclosure provides a software and hardware collaborative compilation processing method.

The method includes the following steps:

(1) Acquiring a name of a source code file of a user according to the compilation instruction information input by the user.

(2) Searching for a file with the name in a specified directory according to the name of the source code file of the user; if the file with the name of the source code file of the user does not exist, outputting an error message and exiting a compilation process; if the file with the name of the source code file of the user exists, opening the file and reading the content of the source code file of the user into a memory, extract macro definition information therein, filling and complementing codes related to a target architecture, outputting a plurality of primarily filled source code files of a heterogeneous target system, and closing the source code file of the user.

(3) Opening the plurality of primarily filled source code files of the heterogeneous target system in sequence, reading the contents into the memory, filling an encapsulated custom VLAN header according to the business scene requirements into a code part of a parsed data packet, outputting secondarily filled source code files, and closing the primarily filled source code files in turn.

(4) Respectively transmitting the secondarily filled source code files to an address space designated by the corresponding heterogeneous target system.

(5) Calling a front-end compiler in turn for performing front-end compilation for the secondarily filled source code files in the specified address space in the heterogeneous target system, outputting JSON files and persisting the files separately to the corresponding heterogeneous target systems.

(6) Valling a middle-end compiler related to the target in turn to read the corresponding JSON file into a system memory of the target, compiling and processing again, and outputting a high-level intermediate representation in a serialized format.

(7) Calling a back-end compiler related to the target in turn to read the corresponding high-level intermediate representation, and outputting runnable target files and configuration files to the specified address space.

(8) Distributing the runnable target files and configuration files to the running environment of the corresponding target subsystems in the heterogeneous target system; executing the runnable target files and configuration files in the running environment, and realizing software and hardware collaborative compilation processing of custom modal data.

Further, in the software and hardware collaborative compilation processing method, when the name of the source code file of the user cannot be found in the specified directory, an error message indicating that "the source code file of the user does not exist" is output.

According to the software and hardware collaborative compilation processing method, before a first compilation, the environment is configured according to a configuration command input by the user.

The present disclosure provides a software and hardware collaborative compilation processing system, wherein the system includes a heterogeneous hardware chip, and an environment configurator, a command parser, a code filler, a scheduler and heterogeneous target systems provided on the heterogeneous hardware chip.

The environment configurator is used for configuring parameter settings required by compiling a running environment.

The command parser is used for receiving a compiling instruction of a user and parsing command parameters.

The code filler is used for obtaining a source program path of the user according to an output of the command parser, reading source codes, identifying a heterogeneous target system according to a macro definition therein, and filling and complementing the codes related to the heterogeneous target system, so as to obtain primarily filled source codes for the heterogeneous target systems; then reprocessing a primarily filled source code file, encapsulating a custom VLAN header with a standard VLAN according to a modal type, filling into a code part of a parsed data packet, and outputting a secondarily filled source code file.

The scheduler is used for realizing the functions of compilation scheduling and execution scheduling; wherein the compilation scheduling specifically includes the following steps: transmitting the secondarily filled source code file output by an interface definer to the heterogeneous target system, and starting the heterogeneous target system for distributed compilation in turn; the execution scheduling includes the following steps: receiving runnable target files and configuration files output by a back-end compiler related to a target, and distributing the runnable target files and configuration files in turn to the running environment of the corresponding target subsystem in the heterogeneous target system.

The heterogeneous target systems include at least two heterogeneous target subsystems; each target subsystem includes a front-end compiler, a middle-end compiler related to the target, the back-end compiler and the running environment related to the target; the heterogeneous target systems are used for compiling and processing modal data of the user.

Further, according to the software and hardware collaborative compilation processing system, when the compiler starts the heterogeneous target system for distributed compilation, the heterogeneous target system is started according to the processing performance of the heterogeneous target system from low to high.

Further, according to the software and hardware collaborative compilation processing system, the heterogeneous target system includes a CPU-based target subsystem, an ASIC-based target subsystem and an FPGA-based target subsystem.

Further, according to the software and hardware collaborative compilation processing system, the scheduler includes a compilation scheduler and an execution scheduler; the compilation scheduler is used for compilation scheduling and the execution scheduler is used for execution scheduling.

Further, according to the software and hardware collaborative compilation processing system, the code filler includes a preprocessing identifier and an interface definer; the preprocessing identifier is used for obtaining the source program path of the user according to the output of the command parser, reading the source codes, identifying the heterogeneous target system according to the macro definition in the source codes, filling and complementing the codes related to the heterogeneous target system, and outputting the primarily filled source codes for the heterogeneous target systems; the interface definer is used for reprocessing the primarily filled source code file output by the preprocessing identifier, encapsulating the custom VLAN header by adopting a standard VLAN according to the modal type, filling into the code part of the parsed data packet, and outputting the secondarily filled source code file.

The present disclosure has the following beneficial effects.

The software and hardware collaborative compilation processing method and system of the present disclosure support users to realize flexible programming of calculation customization, for example the user realizes a customized calculation function through programming, and performs calculation processing such as traffic statistics on ip modal data packets.

The software and hardware collaborative compilation processing method and system of the present disclosure support users to realize flexible programming of storage customization, for example, the user calls the software and hardware cache interface through programming to realize cache processing of NDN modal data packets.

The software and hardware collaborative compilation processing method and system of the present disclosure support users to realize flexible programming of security customization, for example, the user configures and encapsulates, such as IPsec, the encryption algorithm that encrypts ip modal packets and the algorithm that authenticates the data through programming, so as to strengthen the security of sensitive data.

The software and hardware collaborative compilation processing method and system of the present disclosure support users to realize flexible programming of forwarding customization, for example the user realizes multicast and VLAN tagging through programming.

The method and system of the present disclosure support users to flexibly configure the types and combinations of heterogeneous targets by combining the performance requirements of network modal processing and the economic cost of hardware platform investment. For example, a combination of three heterogeneous targets (e.g. Tofino+FPGA+CPU) is configured to implement a backbone level data plane, a combination of two heterogeneous targets (ASIC+CPU/Tofino+CPU) is configured to realize the backbone level data plane, and a single target (X86/ARM) can also be configured to realize an access-level data plane.

DESCRIPTION OF EMBODIMENTS

The technical solutions in the present disclosure will be clearly and completely described below with reference to the following detailed description of the drawings in the present disclosure. Obviously, the described embodiments are part of, not all of the embodiments of the present disclosure. Based on the embodiments of the present disclosure, all other embodiments obtained by those skilled in the art without creative labor shall fall within the scope of the present disclosure.

Figure 1:
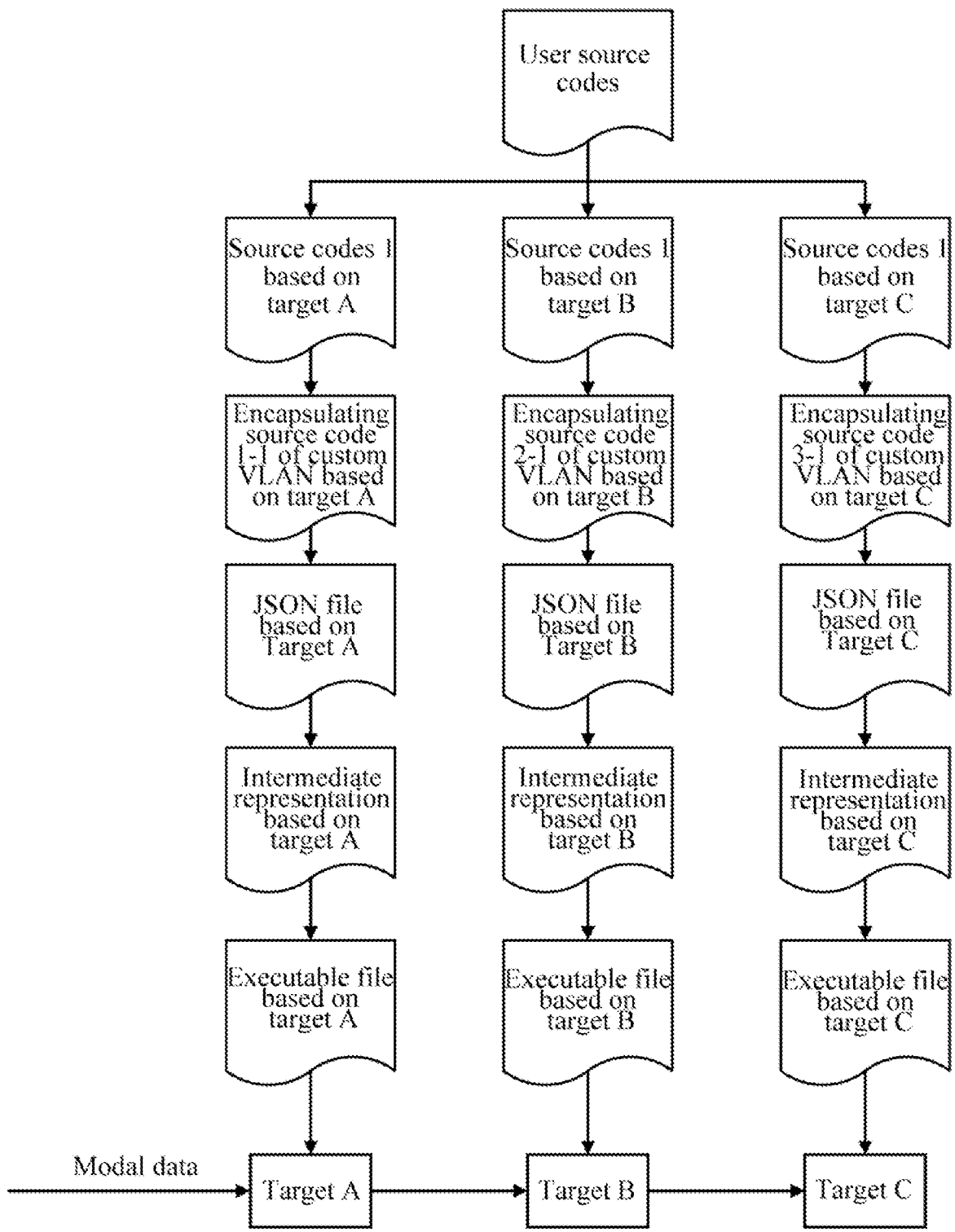
FIG. 1 is a flowchart of a software and hardware collaborative compilation processing method according to the present disclosure.

The present disclosure provides a software and hardware collaborative compilation processing method, and FIG. 1 is a flow chart of the software and hardware collaborative compilation processing method according to the present disclosure, as shown in the figure.

(1) Before the first compilation, the environment is configured according to the configuration command input by a user.

Generally, the user has two ways to call the compiler: graphical operation and command line input. The graphical operation mode requires configuration of the compilation parameters in advance. The command line input mode is flexible since the compilation parameters are after the compilation command. Therefore, it is preferable to start the compilation by way of command line input.

(2) According to the compilation parameters, the name of the source code file of the user is obtained; whether the file with this name exists in the specified directory where the source code is stored is determined, and if it does not exist, a message "user file does not exist" will be output, and the compilation process will be exited, which will help users solve problems according to the error types; if the file exists, the file is opened, the content of the source code file of the user is read into a memory, the macro definition information is extracted to fill and complement the codes related to the target architecture, a plurality of primarily filled source code files of heterogeneous target system are output, and the source code file of the user is closed; as shown in FIG. 1, a source code 1 based on a target A, a source code 2 based on a target B and a source code 3 based on a target C; the targets A, B, and C can be heterogeneous targets such as Tofino, X86, FPGA, ASIC, and ARM, respectively.

(3) The plurality of the primarily filled source code files of the heterogeneous target systems are opened in turn, the contents are read into the memory, an encapsulated custom VLAN header according to the business scene requirements is filled into a code part of a parsed data packet, outputting secondarily filled source code files, and the primarily filled source code files are closed in turn. ASSs shown in FIG. 1, a source code 1-1 based on the target A, a source code 2-1 based on the target B and a source code 3-1 based on the target C.

(4) The secondarily filled source code files are respectively transmitted to an address space designated by the corresponding heterogeneous target system.

(5) A front-end compiler is called in turn for performing front-end compilation for the secondarily filled source code files in the specified address space in the heterogeneous target system, JSON files are output and the files are persisted to the corresponding heterogeneous target systems respectively; as shown in FIG. 1, a JSON file based on the target A, a JSON file based on the target B and a JSON file based on the target C.

(6) A middle-end compiler related to the target is called in turn to read the corresponding JSON file into the system memory of the target to be compiled and processed again, and a high-level intermediate representation in a serialized format is output; as shown in FIG. 1, an intermediate representation base on the target A, an intermediate representation based on the target B, an intermediate representation base on the target C.

(7) A back-end compiler related to the target is called in turn to read the corresponding high-level intermediate representation, and runnable target files and configuration files are output to the specified address space; as shown in FIG. 1, an executable file based on the target A, an executable file based on the target B and an executable file based on the target C.

(8) The runnable target files and configuration files are sequentially distributed to the running environment of the corresponding target subsystems in the heterogeneous target system; the runnable target files and configuration files are executed in the running environment, thereby realizing software and hardware collaborative compilation processing of custom modal data; as shown in FIG. 1, after the modal data is processed by the target A, it is processed by the target B and the target C in turn.

Figure 2:
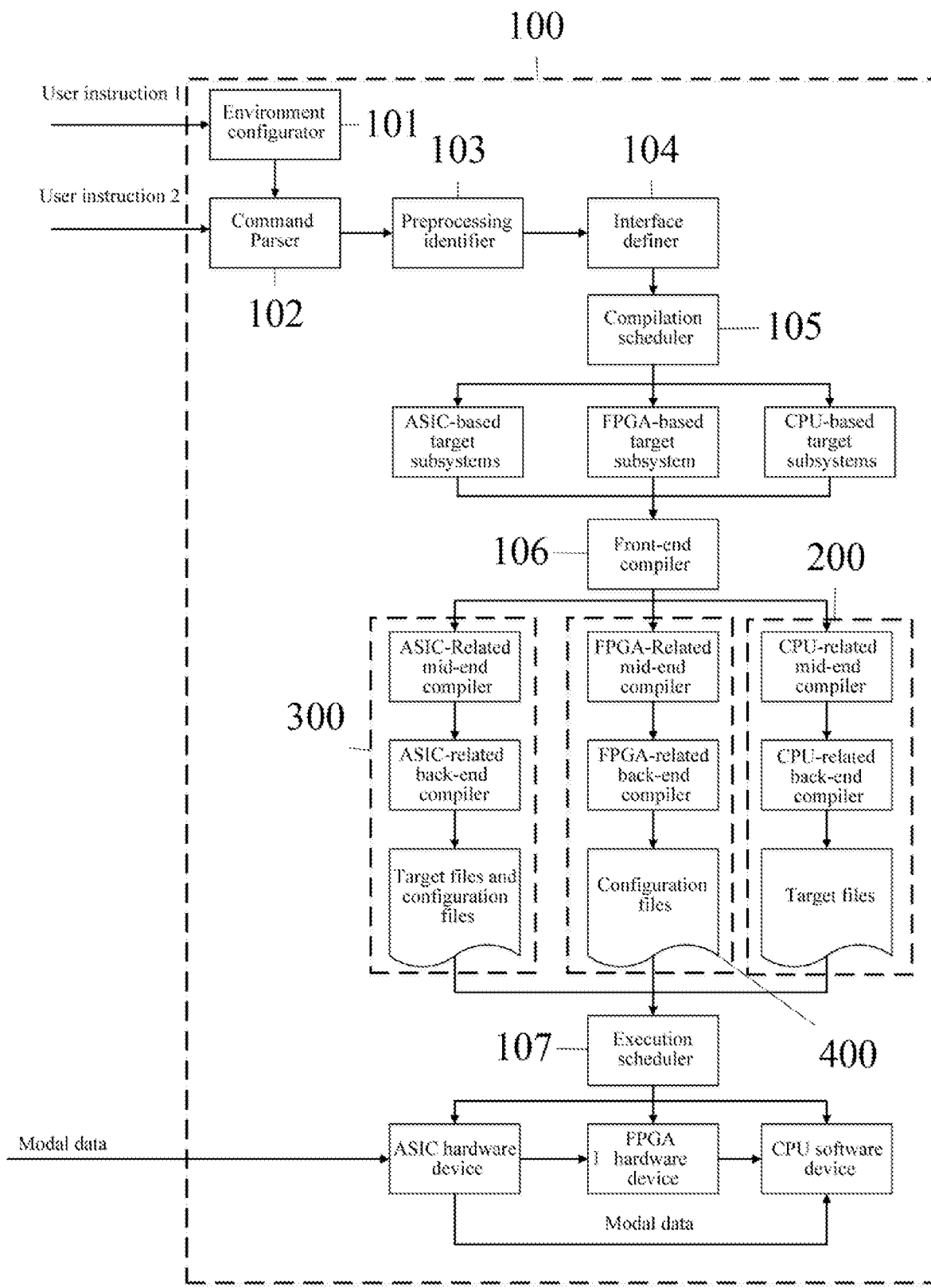
FIG. 2 is a block diagram of the software and hardware collaborative compilation processing system according to the present disclosure.

As shown in FIG. 2, a software and hardware collaborative compilation processing system according to the present disclosure includes:

An environment configurator used for configuring parameter settings required by compiling a running environment.

A command parser used for receiving a compiling instruction of a user and parsing command parameters.

A code filler used for obtaining a source program path of the user according to an output of the command parser, reading source codes, identifying a heterogeneous target system according to a macro definition therein, and filling and complementing the codes related to the heterogeneous target system, so as to obtain primarily filled source codes for the heterogeneous target systems; then reprocessing a primarily filled source code file, encapsulating a custom VLAN header with a standard VLAN according to a modal type, filling into a code part of a parsed data packet, and outputting a secondarily filled source code file.

A scheduler used for realizing the functions of compilation scheduling and execution scheduling; wherein the compilation scheduling specifically comprises the following steps: transmitting the secondarily filled source code file output by an interface definer to the heterogeneous target system, and starting the heterogeneous target system for distributed compilation in turn; the execution scheduling comprises the following steps: receiving runnable target files and configuration files output by a back-end compiler related to a target, and distributing the runnable target files and configuration files in turn to the running environment of the corresponding target subsystem in the heterogeneous target system.

A heterogeneous target system including at least two heterogeneous target subsystems; each target subsystem comprises a front-end compiler, a middle-end compiler related to the target, the back-end compiler and the running environment related to the target; the heterogeneous target system is use for compiling and processing modal data of the user.

Since the processing sequence of the modal data packets is based on the processing performance of the heterogeneous target systems from high to low, in order to enter the collaborative processing state as soon as possible, the compiler scheduler starts the heterogeneous target systems based on the processing performance from low to high when starting the distributed compilation.

Domestic manufacturers' programmable targets include CPU, ASIC and FPGA. Considering the huge difference of processing performance among targets and the supply service of software and hardware products, the heterogeneous target systems adopt the solution including a target subsystem based on CPU, a target subsystem based on ASIC and a target subsystem based on FPGA.

Figure 3:
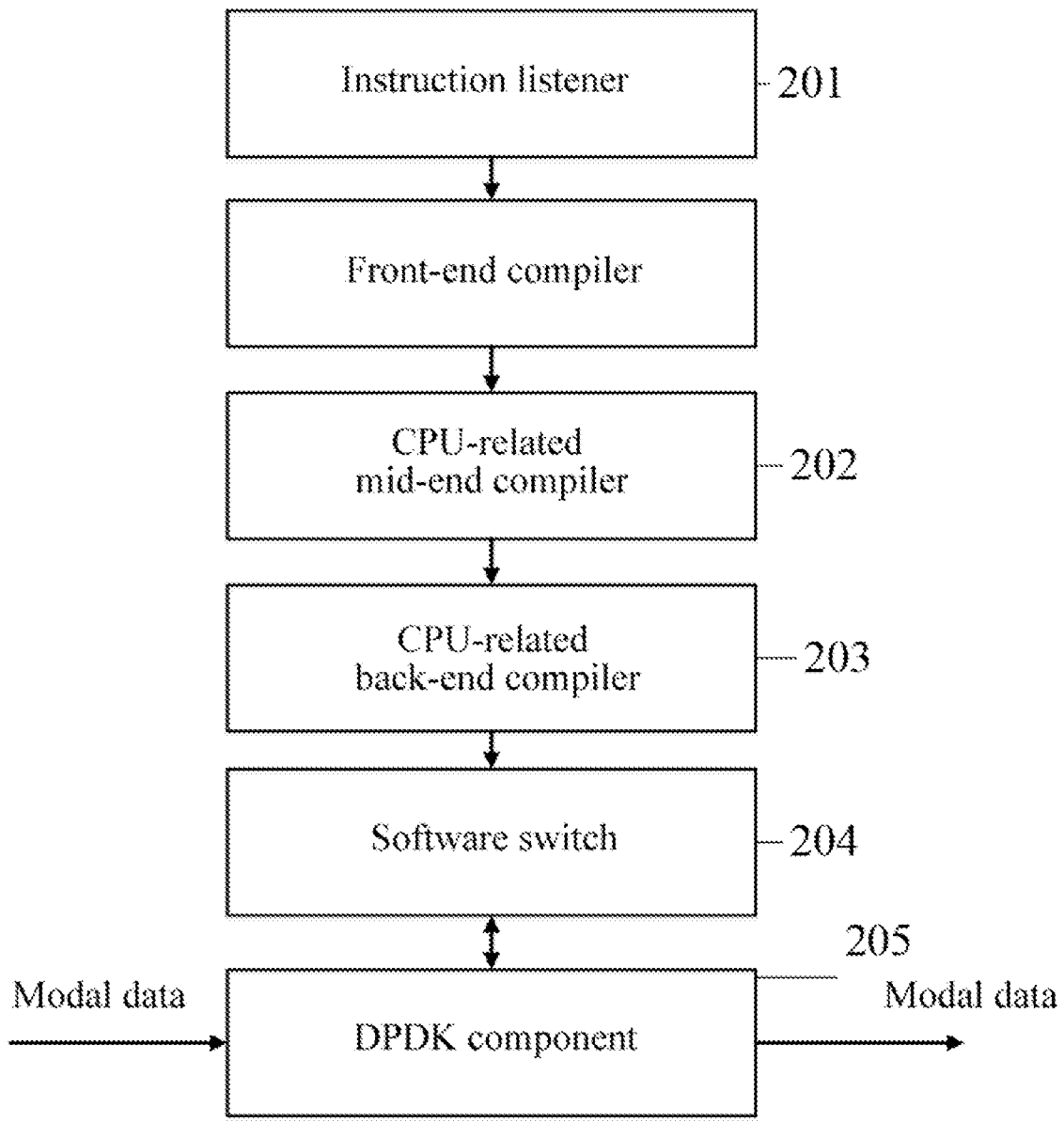
FIG. 3 is a schematic diagram of the compilation process of the target subsystem based on CPU.

The compilation process flow diagram of the target subsystem based on CPU is shown in FIG. 3. After receiving the command from the compiler scheduler, the instruction listener starts the compilation process. The user uses p4 programming to realize the message forwarding function. The program contains core components core.p4 and v1model.p4. The compiler compiles p4 programs respectively into the following modules to be run:

Parser: a protocol parsing module.
VerifyChecksum: a verification module.
Ingress: a message entering processing module.
Traffic manager: a message exchange management module.
Egress: a message export processing module.
Encrypt: a message encryption processing module.
Debaser: a protocol reverse parsing module.

The front-end compiler compiles a C language code block containing an encryption algorithm declaration into a JSON file as a node; the middle-end compiler generates from the JSON file IR (Intermediate Representation) into the memory; the back-end compiler reads IR according to the compilation options, selects the custom component C file, merges it into the data plane module dpdk_v1model.c in a DPDK framework, and compiles it into complete C codes together with the memory representation of the abstract forwarding model.

A gcc/g++ compiler is called to compile the C codes into binary to be run on the programmable switch to realize the function of data plane definable by software.

A DPDK (Intel Data Plane Development Kit) component binds the input and output ports of the data plane. Each port can be configured as a 1G Ethernet port or a 10 G fiber module port. Data is transmitted to the network card for processing through a pipeline, and modal data enters the data plane through one of the ports.

Figure 4:
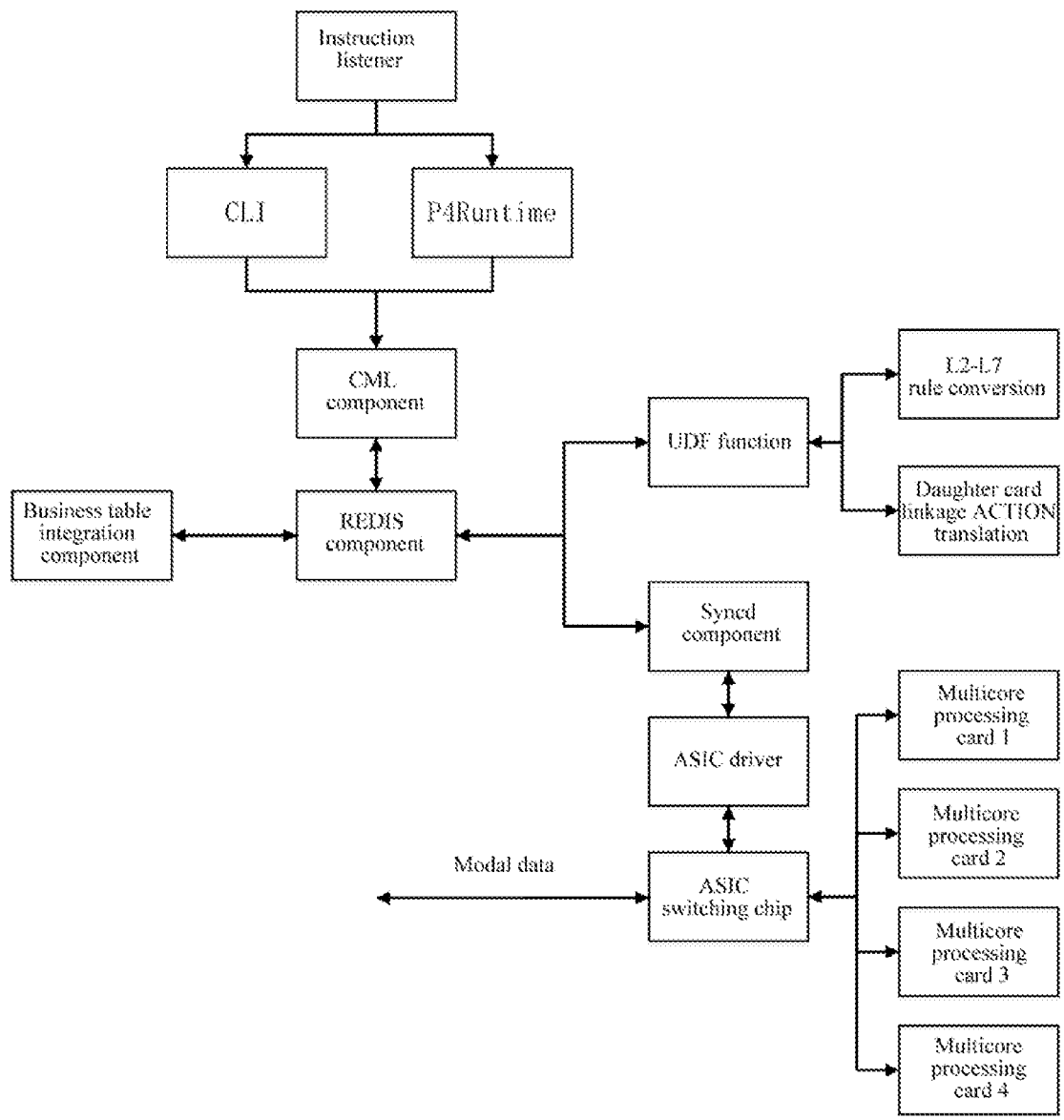
FIG. 4 is a schematic diagram of the compilation process of the target subsystem based on ASIC.

The compilation processing flowchart of the target subsystem based on ASIC is shown in FIG. 4. Taking a Centec 7132 chip as an example, the functions supported by 7132 are sorted, the ACL table entries supported by UDF are sorted, the UDF interface supported by 7132 chip is sorted, and its functions and parameters are classified and sorted. According to the UDF interface and function of 7132, an applicable p4 template and a user interface are sorted out, and meanwhile each interface corresponds to the regular interface provided by the manufacturer. In this embodiment, by combining the related multi-daughter-card hardware architecture, the innovative usage of the UDF+ACL function can identify and guide all kinds of new service flows to multi-core daughter-cards for new service processing, thus constructing a general framework model, providing a flexible and programmable foundation for future dynamic protocol interworking, and realizing multi-modal network interworking.

After stablishing an innovative application framework by the UDF+ACL, it can be supported by UDF ACL+ multi-core daughter-card framework before the chip is launched, thus indirectly achieving the programmable effect of the ASIC forwarding chip and realizing flexible and fast support of various new services. This architecture can also be used to complete the processing of some unsupported business flows by the chip, and a common switching chip that supports UDF ACL can be used to switch various business flows, and realize various business flow gateways, so as to achieve the multi-modal support effect of the network.

Figure 5:
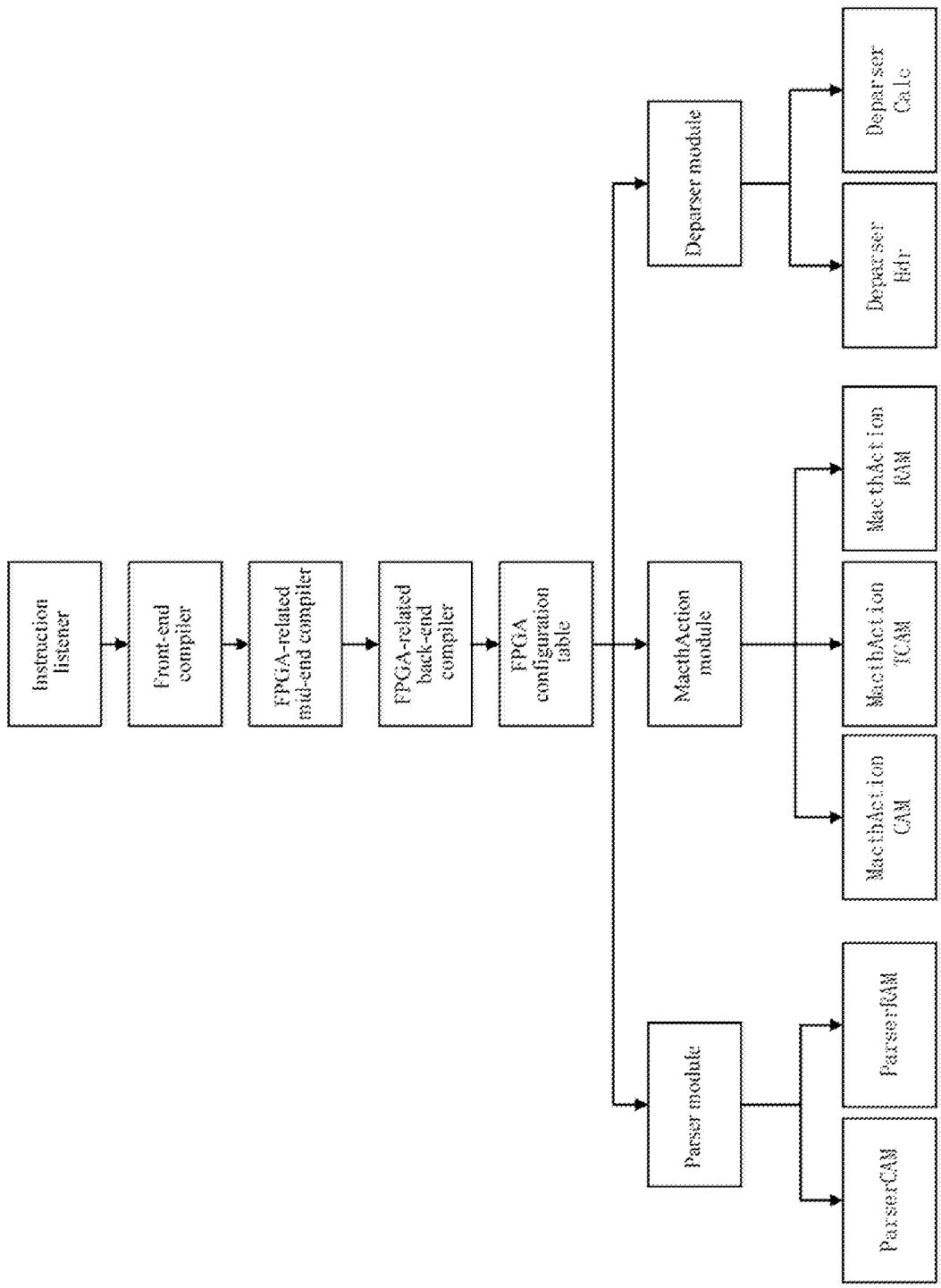
FIG. 5 is a schematic diagram of the compilation process of the target subsystem based on FPGA.

FIG. 5 shows a schematic diagram of the compilation process of the target subsystem based on FPGA. P4 codes are parsed by the front-end compiler and the middle-end compiler and stored in a tree data structure. The top-level root node is of a type Top-Level-Block, and its child nodes are P4Program, which contains all the syntax elements of the P4 program. The back-end directly processes the generated IR, extracts the program information from the IR node, and converts it into a custom data structure to complete one information conversion. Then, based on the custom data structure and the FPGA configuration table format, a FPGA configuration table is generated. A FPGA back-end compiler further parses the FPGA configuration format table into three big modules: a Parser module, a MatchAction module and a Deparser module. The Parser module is further parsed into two tables: ParserCAM and ParserRAM. The MatchAction module is further parsed into three tables: MatchActionCAM, MatchActionTCAM and MatchActionRAM; the Deparser module is further parsed into two tables: DeparserHdr and DeparserCalc.

Considering the independent compilation process between heterogeneous target subsystems, each compiler subsystem includes a front-end compiler.

Considering that the compilation and execution between heterogeneous target subsystems are executed based on certain rules according to the type of modal data, it is necessary to schedule the compilation and execution of the heterogeneous target subsystems. A compilation scheduler and an execution scheduler are included, wherein the compilation scheduler is used for compilation scheduling and the execution scheduler is configured for execution scheduling.

Considering the distribution of the source codes of the user to heterogeneous target compilation, it is necessary to analyze the source codes of the user and complement them according to the requirements of heterogeneous processing. The code filler includes a preprocessing identifier and an interface definer; the preprocessing identifier is used for obtaining the source program path of the user according to the output of the command parser, reading the source codes and identifying the heterogeneous target system according to the macro definition, filling and complementing the codes related to the heterogeneous target system, and outputting primarily filled source code for these heterogeneous target systems.

Considering that the modal data processed by heterogeneous targets form different VLAN broadcasts, it is necessary to encapsulate the source codes compiled by heterogeneous targets in a VLAN interface according to certain rules. The interface definer is used for reprocessing the primarily filled source code file output by the preprocessing identifier, encapsulating the custom VLAN header with a standard VLAN according to the modal type, filling into the code part of the parsed data packet, and outputting a secondarily filled source code file.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

It can be understood by those skilled in the art that the above embodiments are only preferred embodiments of the present disclosure, and are not intended to limit the present disclosure. Although the present disclosure has been described in detail with reference to the above-embodiments, it is still possible for those skilled in the art to modify the technical solutions described in the above embodiments or equivalently replace some of the technical features. The modifications, equivalents and substitutions made within the spirit and principle of the present disclosure shall be included in the scope of protection of the present disclosure.

What is claimed is:

1. A software and hardware collaborative compilation processing method, comprising the following steps:
   (1) acquiring a name of a source code file of a user according to compilation instruction information input by the user;
   (2) searching for a file with a name of the source code file of the user in a specified directory according to the name of the source code file of the user; if the file does exists, outputting an error message and exiting a compilation process; if the file exists, opening the file and reading contents of the source code file of the user into a memory, extracting macro definition information therein, filling and complementing codes related to a target architecture, outputting a plurality of primarily filled source code files of heterogeneous target systems, and closing the source code file of the user;
   (3) opening the plurality of primarily filled source code files of the heterogeneous target systems in turn, reading the contents into the memory, filling an encapsulated custom VLAN header according to the business scene requirements into a code part of a parsed data packet, outputting secondarily filled source code files, and closing the primarily filled source code files in turn;
   (4) transmitting the secondarily filled source code files to an address space designated by a corresponding heterogeneous target system, respectively;
   (5) calling a front-end compiler in turn for performing front-end compilation for the secondarily filled source code files in a specified address space in the heterogeneous target system, outputting JSON files and persisting the files in the corresponding heterogeneous target systems, respectively;
   (6) calling a middle-end compiler related to the target in turn to read the corresponding JSON file into a system memory of the target, compiling and processing again, and outputting a high-level intermediate representation in a serialized format;
   (7) calling a back-end compiler related to the target in turn to read the corresponding high-level intermediate representation, and outputting runnable target files and configuration files to the specified address space; and
   (8) distributing the runnable target files and configuration files in turn to a running environment of the corresponding target subsystems in the heterogeneous target system; executing the runnable target files and configuration files in the running environment, and realizing software and hardware collaborative compilation processing of custom modal data.

2. The software and hardware collaborative compilation processing method according to claim 1, wherein when the name of the source code file of the user is not found in the specified directory, an error message indicating that the source code file of the user does not exist is output.

3. The software and hardware collaborative compilation processing method according to claim 1, wherein before a first compilation, the environment is configured according to a configuration command input by the user.

4. A software and hardware collaborative compilation processing system, wherein the system comprises:
   a heterogeneous hardware chip;
   an environment configurator configured to configure parameter settings required by compiling a running environment;
   a command parser configured to receive a compiling instruction of a user and parsing command parameters;
   a code filler configured to obtain a source program path of the user according to an output of the command parser, read source codes, identify a heterogeneous target system according to a macro definition therein, fill and complement the codes related to the heterogeneous target system so as to obtain primarily filled source codes for the heterogeneous target systems, then reprocess a primarily filled source code file, encapsulate a custom VLAN header with a standard VLAN according to a modal type, fill into a code part of a parsed data packet, and output a secondarily filled source code file;

a scheduler configured to realize functions of compilation scheduling and execution scheduling; wherein the compilation scheduling comprises the following steps: transmitting the secondarily filled source code file output by an interface definer to the heterogeneous target system, and starting the heterogeneous target system for distributed compilation in turn, and wherein the execution scheduling comprises the following steps: receiving runnable target files and configuration files output by a back-end compiler related to a target, and distributing the runnable target files and configuration files in turn to the running environment of the corresponding target subsystem in the heterogeneous target system; and a heterogeneous target system comprising at least two heterogeneous target subsystems, wherein each target subsystem comprises a front-end compiler, a middle-end compiler related to the target, the back-end compiler and the running environment related to the target, and wherein the heterogeneous target systems are configured to compile and process modal data of the user;

wherein the heterogeneous hardware chip, the environment configurator, the command parser, the code filler, the scheduler and the heterogeneous target system are provided on the heterogeneous hardware chip.

5. The software and hardware collaborative compilation processing system according to claim 4, wherein when the compiler starts the heterogeneous target system for distributed compilation, the heterogeneous target system is started according to the processing performance of the heterogeneous target system from low to high.

6. The software and hardware collaborative compilation processing system according to claim 4, wherein the heterogeneous target system comprises a CPU-based target subsystem, an ASIC-based target subsystem and an FPGA-based target subsystem.

7. The software and hardware collaborative compilation processing system according to claim 6, wherein the scheduler comprises a compilation scheduler and an execution scheduler; the compilation scheduler is configured to compile scheduling and the execution scheduler is configured to execute scheduling.

8. The software and hardware collaborative compilation processing system according to claim 6, wherein the code filler comprises a preprocessing identifier and an interface definer; the preprocessing identifier is configured to obtain the source program path of the user according to the output of the command parser, read the source codes, identify the heterogeneous target system according to the macro definition in the source codes, fill and complement the codes related to the heterogeneous target system, and output the primarily filled source codes for the heterogeneous target systems;

the interface definer is configured to reprocess the primarily filled source code file output by the preprocessing identifier, encapsulate the custom VLAN header by adopting a standard VLAN according to the modal type, fill into the code part of the parsed data packet, and output the secondarily filled source code file.

* * * * *